United States Patent Office 3,037,004
Patented May 29, 1962

3,037,004
AQUEOUS PHASE POLYMERIZATION OF VINYL MONOMERS WITH ORGANIC COCATALYSTS
Dominic Simone, Bronx, N.Y., and Daniel F. Herman, Orange, N.J., assignors to National Lead Company, New York, N.Y., a corporation of New York
No Drawing. Filed Oct. 7, 1958, Ser. No. 765,731
15 Claims. (Cl. 260—80)

This invention relates to the polymerization of vinyl monomers. In particular, this invention relates to a novel process for effecting the polymerization of vinyl monomers using a novel catalyst, cocatalyst system.

Processes incorporating certain titanium compounds such as $TiCl_4$ had previously been known and used in the polymerization of certain monomers, such as ethylene, propylene and styrene. The titanium compounds were generally used in conjunction with an organometallic compound, such as an alkyl metal compound. It is believed that the alkyl metal compound and titanium compounds when used together in the polymerization process reacted with one another resulting in an organotitanium compound and it was actually this organotitanium compound which was effective in the polymerization of monomers such as ethylene, propylene and styrene. However, these systems were not generally effective in the presence of polar media and for the polymerization of highly polar monomers and furthermore were unstable in the presence of water. Recently, see copending application Serial Number 714,503, filed February 11, 1958, assigned to the assignee hereof, a new process utilizing a new type of titanium catalyst, which could be used in an aqueous system, was developed. This resulted in the development of cocatalysts which were effective in the presence of water, and which would increase the rate of polymerization and act in conjunction with the new type of titanium catalyst. The cocatalysts which had been developed and found to be effective in the presence of water and able to act in conjunction with the new type of titanium catalyst were the halogenated acetic acids, see copending application cited above.

An object of this invention, therefore, is to provide an improved method for the polymerization of vinyl monomers. Another object is to provide an improved method for the polymerization of vinyl monomers which may be carried out in an aqueous medium using an organometallic catalyst of a transition metal. Still another object is to provide an improved method for the polymerization of vinyl monomers in an aqueous medium using an organometallic catalyst of a transition metal and a cocatalyst which are effective in the presence of water. Other objects and advantages will become apparent from the following more complete description and claims.

Broadly, this invention contemplates a process for the polymerization of a vinyl monomer, said vinyl monomer being selected from the group consisting of acrylates, alkyl substituted acrylates, styrene, alkyl substituted styrene, and acrylonitrile, comprising the steps of dispersing said vinyl monomer in a liquid system containing a first compound of the formula $R_nMR'_m$, wherein R is a monovalent hydrocarbon radical selected from the group consisting of cyclopentadienyl and substituted cyclopentadienyl radicals, M is a metal selected from the class of metals consisting of the group IV transition metals, R' is selected from the group consisting of alkoxy, cycloalkoxy and acyloxy groups and halogen atoms, n is from one to two and m is from one to three, and when m is 3, at least one R' must be halogen or acylate, the sum of m and n being from 3 to 4, said liquid system also containing a second compound of the formula

wherein Y and Y' are selected from the class of radicals consisting of aliphatic, aromatic, and substituted aromatic radicals, and hydrogen, and heating the mixture until the reaction is substantially complete.

In a particularly desirable embodiment this invention contemplates a process as aforesaid wherein said first compound contains a radical selected from the group consisting of cyclopentadienyl, substituted cyclopentadienyl, and indenyl radicals. Among such compounds may be mentioned particularly biscyclopentadienylzirconium dichloride, biscyclopentadienyltitanium dichloride, bisindenyltitanium dichloride, indenyltitanium dichloride, bis-(methylcyclopentadienyl) titanium dichloride, monocyclopentadienyltitanium dichloride, cyclopentadienyl-titanium trichloride, biscyclopentadienyltitanium monochloride. The preparation of these compounds has been described in copending application, Serial Number 443,956, D. F. Herman, filed July 16, 1954 and assigned to the assignee hereof. The alkoxy and cycloalkoxy groups, if present may be substituted or unsubstituted and saturated or unsaturated groups containing up to about 16 carbon atoms. It is preferred however, in the case of the alkoxy and cycloalkoxy groups, to employ low molecular weight groups containing less than 7 carbon atoms such as monocyclopentadienyltitanium dibutoxy monochloride, and monocyclopentadienyltitanium dicyclohexoxy monochloride, because such groups are more reactive. The acyloxy group may be unsubstituted, or may be a halogenated acyloxy group as in biscyclopentadienyltitanium di(trichloroacetate). The acyloxy group may contain up to about eight carbon atoms. It is preferred however, to employ those acyloxy groups containing six or fewer carbon atoms as these have generally been found to be the most effective.

The second compound, or cocatalyst is an aldehyde or ketone such as formaldehyde, acetaldehyde, n-butyraldehyde, n-hexaldehyde, n-heptaldehyde, benzaldehyde, para methylbenzaldehyde, acetone, methylethyl ketone, acetyl acetone, cyclohexanone, butylmethyl ketone, di-n-propyl ketone, di-n-butyl ketone, diphenyl ketone, methylphenyl ketone, and the like.

The ratio of cocatalyst to catalyst may vary widely in the discretion of the individual operator. As much as 5 parts by weight of the cocatalyst to 1 part of the catalyst by weight has been used, and as little as 0.5 part of the cocatalyst to 1 part of the catalyst has been successfully used.

The monomers useful in this process include acrylates, alkyl substituted acrylates, styrene, alkyl substituted styrene and acrylonitrile.

By acrylate, we mean the esters of acrylic acid containing the $H_2C=CHCOO-$ group, such as methyl acrylate, ethyl acrylate, hexyl acrylate, octyl acrylate, and the like, as well as acrylic acid itself.

By alkyl substituted acrylates, we mean the esters of substituted acrylic acids containing the $H_2C=CRCOO-$ group, and having said substitution on the alpha carbon of the H₂C=CRCOO— group. Exemplary of such compounds are methyl methacrylate, octyl methacrylate, ethyl-(ethylacrylate), methyl-(butylacrylate) and the like, as well as the acids themselves.

The alkyl substituted styrene is one where the alkyl substitution is on the aromatic portion of the molecule, such as vinyl toluene, isopropyl styrene, and the like.

Water may be present. The role of water in the process according to this invention is not fully established, but the process appears to be most effective when water is present, as the liquid used in the system.

It is possible that the high solvating power of the water is a factor in causing the metallic cyclopentadienyl or substituted metallic cyclopentadienyl to breakdown into active polymerization initiator fragments. When Example I with a high solvating medium is compared to Example X with a low solvating medium it is readily discernible, that the use of water in Example I resulted in higher percent theoretical yields than that of Example X where benzene was used.

The foregoing discussion is not to be considered as binding and in no way should it be construed as limiting the scope of the invention.

The organic liquids which may be used as the reaction medium, other than water, are those organic liquids which are normally used in a polymerization process. Typical of the organic liquids which may be used as the reaction medium are benzene, toluene, xylene, cyclohexane, and the like.

A wetting agent or suspending agent may be used if desired and generally proves advantageous. The choice of a wetting agent is not critical and may be left to the discretion of the operator or to economic considerations. Wetting and suspending agents such as sodium lauryl sulfate and polyvinyl alcohol and the like may be used.

The time necessary to effect polymerization will vary according to the reaction conditions employed, but is short in all cases. The reaction proceeds readily at moderately elevated temperatures although higher temperatures may be employed, if desired, up to the boiling point of water at the pressure employed. No great pressure is necessary in order to cause the reaction to proceed; atmospheric pressure is satisfactory. Moderately increased pressures up to about 3 or 4 atmospheres may be employed if desired and are sometimes advantageous, and where low boiling liquids are used, increased pressure is helpful in preventing the loss of the monomer.

In the examples which follow, reference will be made to monocyclopentadienyltitanium dichloride. By monocyclopentadienyltitanium dichloride, we mean the oxidized form as disclosed in Serial Number 588,600, filed June 1, 1956, now U.S. Patent No. 2,911,424 and assigned to the assignee hereof, as well as the reduced form. The reduced form may be prepared by a reduction of monocyclopentadienyltitanium trichloride using zinc.

In order to more fully illustrate the nature of this invention and the manner of practising the same, the following examples are presented.

*Example I*

To a flask containing 250 parts of water was added 100 parts of methylmethacrylate, 1 part of biscyclopentadienyltitanium dichloride, 5 parts of sodium lauryl sulfate as an emulsifying agent, and 1.3 parts of formaldehyde. The reaction was run under a nitrogen atmosphere, stirred, and heated to 70° C. until the reaction was complete. A high yield of white polymethyl methacrylate was obtained by washing the product with methanol and drying it at a moderate temperature under vacuum.

As a control, the above procedure was repeated, but no aldehyde or ketone was herein used. A good yield of white polymethyl methacrylate was obtained in the manner of Example I, described above. The yield obtained in this control however, was not as high as when the aldehyde was used.

*Example II*

To a flask containing 100 parts of benzene was added 1 part of biscyclopendienyltitanium dichloride, 0.5 part of zinc dust, and 5 parts of acetic acid. The reaction was run under a nitrogen atmosphere, stirred and heated slightly until the reaction was complete. The biscyclopentadienyltitanium dichloride was thus reduced from tetravalent state, to the trivalent state. The compound formed was biscyclopentadienyltitanium monochloride.

The procedure of Example I was then followed, except that an equivalent amount of the biscyclopentadienyltitanium monochloride was used instead of the biscyclopentadienyltitanium dichloride. A high yield of white polymethyl methacrylate was obtained in the manner of Example I.

*Example III*

The procedure of Example I was repeated, but an equivalent amount of biscyclopentadienylzirconium dichloride was used instead of the biscyclopentadienyltitanium dichloride and the reaction was run at 65° C. A high yield of white polymethyl methacrylate was obtained in the manner of Example I.

As a control, the procedure of Example III was repeated, but no aldehyde or ketone was used in this control. A good yield of white polymethyl methacrylate was obtained in the manner of Example I. The yield obtained in this control however, was not as high as when the aldehyde was used.

*Example IV*

The procedure of Example I was repeated, and the reaction was run at 95° C. The monomer used in this example was an equivalent amount of styrene. A good yield of white polystyrene was obtained in the manner of Example I.

*Example V*

The procedure of Example I was repeated several times. The aldehyde and ketone used was changed each time in amounts equivalent to the amount used in Example I. Among the aldehydes and ketones used were: acetaldehyde, n-butyraldehyde, n-hexaldehyde, n-heptaldehyde, benzaldehyde, para methylbenzaldehyde, acetone, ethylmethyl ketone, di-n-propyl ketone, di-n-butyl ketone, diphenyl ketone, acetylacetone, and methylphenyl ketone. Each time a high yield of white polymethyl methacrylate was obtained in the manner of Example I.

*Example VI*

The procedure of Example I was repeated, but an equivalent amount of monocyclopentadienyltitanium ditrichloroacetoxy monochloride was used instead of the biscyclopentadienyltitanium dichloride. A good yield of white polymethylmethacrylate was obtained in the manner of Example I.

*Example VII*

The procedure of Example I was repeated several times. Each time an equivalent amount of a different monomer was used in the reaction. Among the monomers used were: methyl acrylate, hexyl acrylate, octyl acrylate, ethyl acrylate, methacrylic acid, octyl methacrylate, ethyl-(ethylacrylate), methyl-(butylacrylate), acrylonitrile, acrylic acid, vinyl toluene, and isopropyl styrene. Each time a high yield of polymer was obtained in the manner of Example I.

*Example VIII*

The procedure of Example I was repeated twice but an equivalent amount of first the reduced form, and then the oxidized form of monocyclopentadienyltitanium dichloride was used instead of the biscyclopentadienyltitanium dichloride. Each time a high yield of white polymethacrylate was obtained in the manner of Example I.

Example IX

The procedure of Example I was repeated several times. Each time an equivalent amount of a different titanium compound was used in the reaction. Among the titanium compounds used were: methylcyclopentadienyltitanium dichloride, and indenyltitanium dichloride. Each time a high yield of white polymer obtained in the manner of Example I.

Example X

The procedure of Example I was repeated, except that 100 parts of benzene was used in this Example in place of the 250 parts of water used in Example I. A good yield of white polymethyl methacrylate was obtained in the manner of Example I.

The yield however, in this Example X, was not as high as when water was present in the reaction mixture.

Example XI

The polymethyl methacrylate formed in Example I was compression molded into several articles, such as an electrical fixture housing, an automobile taillight housing and costume jewelry.

The compression molding was accomplished via conventional compression molding methods.

Polystyrene, prepared according to the process of this invention, was compared with a typical commercial polystyrene. It was found that the polystyrene prepared according to the process of this invention had a greater tensile strength, a greater net impact strength, and showed much less deformation under load, all compared to the typical commercial polystyrene.

Therefore, as is readily obvious, the polystyrene prepared according to the process of this invention, is able to absorb more energy than the typical commercial polystyrene, before deforming or failing. From a practical point of view, articles may be fabricated from polystyrene prepared according to the process of this invention, where greater rigidity, less cold flow, and resistance to repeated blows are required such as in inexpensive toys, battery cases, radio cabinets and the like.

The process of this invention is simple and can readily be carried out by the operator, without special skill or training. The use of water as the reaction medium in one embodiment of this invention substantially eliminates other costly and hazardous media. The aldehydes and ketones are a new type of compound for use with the titanium compounds herein described to effect an aqueous polymerization, and the entire system is effective in the presence of water.

The resultant polymers may be used to produce a wide variety of articles, such as electrical insulation, radome housings, ornaments, electrical fixture housings, household goods such as spoons, dishes, cups, etc., adhesives, protective coatings, and the like. These uses may be accomplished via injection molding, compression molding, casting, and in addition, the polymers may be extruded, and also calender milled into sheets. The milling and extruding enable the producer of the polymers to supply the manufacturer of various articles with a convenient form of the polymer ready for processing into the finished article.

While this invention has been described in terms of certain preferred embodiments and illustrated by means of specific examples, these are illustrative only, and the invention is not to be construed as limited, except as set forth in the following claims.

We claim:

1. A process for the polymerization of a vinyl monomer, said vinyl monomer being selected from the group consisting of acrylic acid, lower alkyl substituted acrylic acids, acrylates of saturated aliphatic monohydroxy alcohols, alkacrylates of saturated aliphatic monohydroxy alcohols, nuclear alkyl-substituted styrene and acrylonitrile, comprising the steps of dispersing said vinyl monomer in a liquid system containing a first compound of the formula $R_nMR'_m$, wherein R is a monovalent hydrocarbon radical selected from the group consisting of cyclopentadienyl, methylcyclopentadienyl and idenyl radicals, M is a metal selected from the group consisting of titanium and zirconium, R' is selected from the group consisting of alkoxy, cycloalkoxy and acyloxy groups and halogen atoms, $n$ is from one to two and $m$ is from one to three, and when $m$ is three, at least one R' must be selected from the group consisting of halogens and acylates, the sum of $m$ and $n$ being from three to four, said liquid system also containing a second compound selected from the group consisting of ketones and aldehydes whose carbonyl group is not in an aromatic ring, and heating the mixture until the reaction is substantially complete.

2. A process according to claim 1, wherein said liquid is water.

3. A process according to claim 1, wherein said second compound is acetone.

4. A process according to claim 1, wherein said second compound is diphenyl ketone.

5. A process according to claim 1, wherein said second compound is methylethyl ketone.

6. A process according to claim 1, wherein said second compound is acetyl acetone.

7. A process according to claim 1, wherein said second compound is cyclohexanone.

8. A process according to claim 1, wherein said second compound is formaldehyde.

9. A process according to claim 1, wherein said liquid is benzene.

10. A process according to claim 1, wherein said liquid is toluene.

11. A process according to claim 1, wherein said liquid is xylene.

12. A process according to claim 1, wherein said liquid is cyclohexane.

13. A process according to claim 1, wherein said first compound is biscyclopentadienyltitanium dichloride.

14. A process according to claim 1, wherein said first compound is biscyclopentadienylzirconium dichloride.

15. A process according to claim 1, wherein said heating is from a temperature of about 65° C. to about the boiling point of water.

References Cited in the file of this patent

UNITED STATES PATENTS

| | | |
|---|---|---|
| 2,827,446 | Breslow | Mar. 18, 1958 |
| 2,881,156 | Pilar et al. | Apr. 7, 1959 |

FOREIGN PATENTS

| | | |
|---|---|---|
| 793,354 | Great Britain | Apr. 16, 1958 |